US010557577B2

(12) United States Patent
Smith, III et al.

(10) Patent No.: US 10,557,577 B2
(45) Date of Patent: Feb. 11, 2020

(54) SUBSEA HYDRAULIC COUPLING WITH METAL BORE LINER

(71) Applicant: National Coupling Company, Inc., Stafford, TX (US)

(72) Inventors: Robert E. Smith, III, Missouri City, TX (US); Scott Stolle, Stafford, TX (US)

(73) Assignee: National Coupling Company, Stafford, TX (US)

( * ) Notice: Subject to any disclaimer, the term of this patent is extended or adjusted under 35 U.S.C. 154(b) by 49 days.

(21) Appl. No.: 15/730,993

(22) Filed: Oct. 12, 2017

(65) Prior Publication Data

US 2018/0106403 A1    Apr. 19, 2018

Related U.S. Application Data

(60) Provisional application No. 62/408,533, filed on Oct. 14, 2016.

(51) Int. Cl.
*F16L 21/08* (2006.01)
*F16L 21/00* (2006.01)
(Continued)

(52) U.S. Cl.
CPC .............. *F16L 21/002* (2013.01); *F16L 1/26* (2013.01); *F16L 21/08* (2013.01); *F16L 57/06* (2013.01)

(58) Field of Classification Search
CPC . F16L 17/00; F16L 17/02; F16L 17/04; F16L 17/06; F16L 17/063; F16L 17/08; F16L 17/10
(Continued)

(56) References Cited

U.S. PATENT DOCUMENTS 3,409,314 A * 11/1968 Roe ................... F16L 19/028
285/105
4,302,020 A * 11/1981 Morales ................ F16J 15/28
277/530
(Continued)

FOREIGN PATENT DOCUMENTS

CN        204532221        8/2015
DE     102004041928 A1    4/2005
(Continued)

OTHER PUBLICATIONS

Office Action cited in counterpart German Application No. 10 2017 218 309.8, dated Mar. 15, 2019.
(Continued)

*Primary Examiner* — Aaron M Dunwoody
(74) *Attorney, Agent, or Firm* — Blank Rome LLP

(57) ABSTRACT

A female hydraulic coupling member has a pressure-energized C-seal having an internal cavity that is positioned to seal between the body of the coupling and the probe of a corresponding male hydraulic coupling member inserted in the receiving chamber. A metal sleeve lines at least a portion of the receiving chamber to resist galling. The main portion of the sleeve has an inside diameter (i.d.) and an outside diameter (o.d.) with a first end of the sleeve abutting a shoulder in the central axial bore of the coupling member. An opposing second end of the sleeve has an annular, axial extension with a larger i.d. and a smaller o.d. than the main portion of the sleeve. At least a portion of the extension projects into the internal cavity of the pressure-energized C-seal so as to retain and position it.

26 Claims, 2 Drawing Sheets

(51) Int. Cl.
*F16L 1/26* (2006.01)
*F16L 57/06* (2006.01)

(58) Field of Classification Search
USPC .......................................... 285/374, 110, 111
See application file for complete search history.

(56) References Cited

U.S. PATENT DOCUMENTS

| | | | |
|---|---|---|---|
| 4,346,921 A * | 8/1982 | Gill | ................. E02D 29/12 285/110 |
| 4,694,859 A | 9/1987 | Smith, III | |
| 4,749,045 A | 6/1988 | Gano | |
| 4,900,071 A | 2/1990 | Smith, III | |
| 5,052,439 A | 10/1991 | Smith, III | |
| 5,099,882 A | 3/1992 | Smith, III | |
| 5,203,374 A | 4/1993 | Smith, III | |
| 5,232,021 A | 8/1993 | Smith | |
| 5,762,106 A | 6/1998 | Smith, III | |
| 6,575,430 B1 * | 6/2003 | Smith, III | ................. F16L 1/26 251/149.7 |
| 6,663,144 B1 * | 12/2003 | Smith, III | ............. E21B 33/038 285/110 |
| 6,923,476 B2 | 8/2005 | Smith | |
| 7,303,194 B2 * | 12/2007 | Smith, III | ............ F16J 15/0887 277/647 |
| 7,575,256 B2 * | 8/2009 | Smith, III | ............... F16L 33/16 285/374 |
| 2009/0200793 A1 * | 8/2009 | Smith, III | ............ F16J 15/3268 285/111 |
| 2010/0084859 A1 * | 4/2010 | Kirkman | ............... E21B 33/038 285/232 |
| 2018/0094498 A1 * | 4/2018 | Smith, III | ........... E21B 33/1212 |

FOREIGN PATENT DOCUMENTS

| | | |
|---|---|---|
| DE | 102004038352 A1 | 5/2005 |
| GB | 2396372 A | 6/2004 |
| GB | 2557004 A | 6/2018 |
| WO | 199711302 A1 | 3/1997 |

OTHER PUBLICATIONS

Examination report cited in counterpart Great Britain Application No. GB1716789.1, dated Jul. 12, 2019.

* cited by examiner

SUBSEA HYDRAULIC COUPLING WITH METAL BORE LINER

CROSS-REFERENCE TO RELATED APPLICATIONS

This application claims the benefit of U.S. Application No. 62/408,533 filed on Oct. 14, 2016, the contents of which are hereby incorporated by reference in their entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to hydraulic couplings used in subsea oil and gas drilling and production applications. More particularly, it relates to female subsea hydraulic coupling members having a removable and replaceable bore liner for preventing galling of the male or female member.

2. Description of the Related Art Including Information Disclosed Under 37 CFR 1.97 and 1.98

Subsea hydraulic couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section sized and configured for insertion into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical seal retainer. When the male and female portions of the coupling are parted under pressure, the seal retainer prevents the metal seal from blowing out through the bore of the female member.

U.S. Pat. Nos. 4,900,071 and 5,052,439 to Robert E. Smith III disclose an undersea hydraulic coupling with an elastomeric seal that is restrained from radial movement into the central bore of the female member by a circumferential shoulder on one or both surfaces adjacent the seal. Preferably, the seal has a dovetail interfit with one or both surfaces.

U.S. Pat. Nos. 5,099,882, 5,203,374, 5,232,021 to Robert E. Smith III also show undersea hydraulic couplings with these seals. An inner cylindrical surface of the annular seal engages the circumference of the male member or probe as the probe is inserted into the female member. As the male member or probe is pulled out of the female member bore, the leading face of the male member reaches the soft annular seal intermediate that bore. When the face reaches the midpoint of the soft annular seal, the dovetail interfit prevents the seal from imploding into the bore, as the seawater and/or hydraulic fluid enter the bore at high pressure.

To retain one or more seals in the female member of an undersea hydraulic coupling, a seal retainer may be attached to the female member. The seal retainer may be a generally sleeve-shaped cylindrical body that is inserted into the bore of the female member until the seal retainer abuts a shoulder in the bore of female member. To secure the seal retainer against the shoulder, a retainer locking member may also be attached to the female member using threads or snap rings, for example. A radial seal may be retained between the seal retainer and retainer locking member. Additionally, one or more face seals may be positioned between the seal retainer and shoulder.

In subsea drilling and production applications, female coupling members may be disengaged and re-engaged from male coupling members repeatedly. After disengagement, it is common that the male coupling members remain undersea and the female coupling members retrieved. Insertion of the male coupling member into the bore of the female coupling member, or removal of the male coupling member from the bore, may result in galling of the surfaces of the probe and/or bore. Galling may be caused, for example, by significant misalignment, or even very slight misalignment, of the male and female coupling members during their engagement or disengagement. In general, galling of the male and/or female coupling members is a serious problem because of damage to the sealing surfaces that are important to maintain fluid-tight seals to block leakage of hydraulic fluid and/or entry of seawater into the coupling at high pressure. Additionally, after a sealing surface of either coupling member becomes galled, it may be more likely to gall again.

Galling is a form of wear caused by adhesion between sliding surfaces. When a material galls, some of it is pulled with the contacting surface, especially if there is a large amount of force compressing the surfaces together. Galling is caused by a combination of friction and adhesion between the surfaces, followed by slipping and tearing of crystal structure beneath the surface. This will generally leave some material stuck or even friction welded to the adjacent surface, whereas the galled material may appear gouged with balled-up or torn lumps of material stuck to its surface.

Galling is most commonly found in metal surfaces that are in sliding contact with each other. It is especially common where there is inadequate lubrication between the surfaces. However, certain metals will generally be more prone to galling, due to the atomic structure of their crystals. For example, aluminum is a metal that will gall very easily, whereas annealed (softened) steel is slightly more resistant to galling. Steel that is fully hardened is very resistant to galling.

Galling is a common problem in most applications where metals slide while in contact with other metals. This can happen regardless of whether the metals are the same or of different kinds. Metals such as brass are often chosen for bearings, bushings, and other sliding applications because of their resistance to galling, as well as other forms of mechanical abrasion.

In the past, some male undersea hydraulic coupling members have been made from material with greater hardness, strength and yield than the material used to make female coupling members. The difference in hardness is intended to help reduce the galling problem. However, it is desirable to produce both the male and female coupling members from higher strength, higher yield materials, especially as hydraulic pressures and/or subsea pressures increase at greater depths where subsea hydraulic systems are located. Accordingly, an undersea hydraulic coupling is needed that will reduce or prevent the galling problem due to repeated engagement and disengagement of the coupling members.

U.S. Pat. No. 7,575,256 to Robert E. Smith III discloses an undersea hydraulic coupling member having a bore liner that protects the coupling members from galling during assembly or disassembly. The bore liner is removable from the bore of a female undersea hydraulic coupling member. The bore liner may be integral with a seal section that may seal with a male undersea hydraulic coupling member. The bore liner also may have an outer diameter configured to engage and interlock with the bore in which the bore liner is positioned. In certain embodiments, the bore liner comprises a one-piece, sleeve-shaped, polymer liner section.

BRIEF SUMMARY OF THE INVENTION

A female hydraulic coupling member has a pressure-energized C-seal having an internal cavity that is positioned to seal between the body of the coupling and the probe of a corresponding male hydraulic coupling member inserted in the receiving chamber. A metal sleeve lines at least a portion of the receiving chamber to resist galling. The sleeve has an inside diameter (i.d.) and an outside diameter (o.d.) with a first end of the sleeve abutting a shoulder in the central axial bore of the coupling member. An opposing second end of the sleeve has an axially projecting, annular extension with a larger i.d. and a smaller o.d. than the sleeve. At least a portion of the extension projects into the internal cavity of the pressure-energized C-seal so as to retain and position it.

BRIEF DESCRIPTION OF THE SEVERAL VIEWS OF THE DRAWING(S)

DETAILED DESCRIPTION OF THE INVENTION

Figure 1:
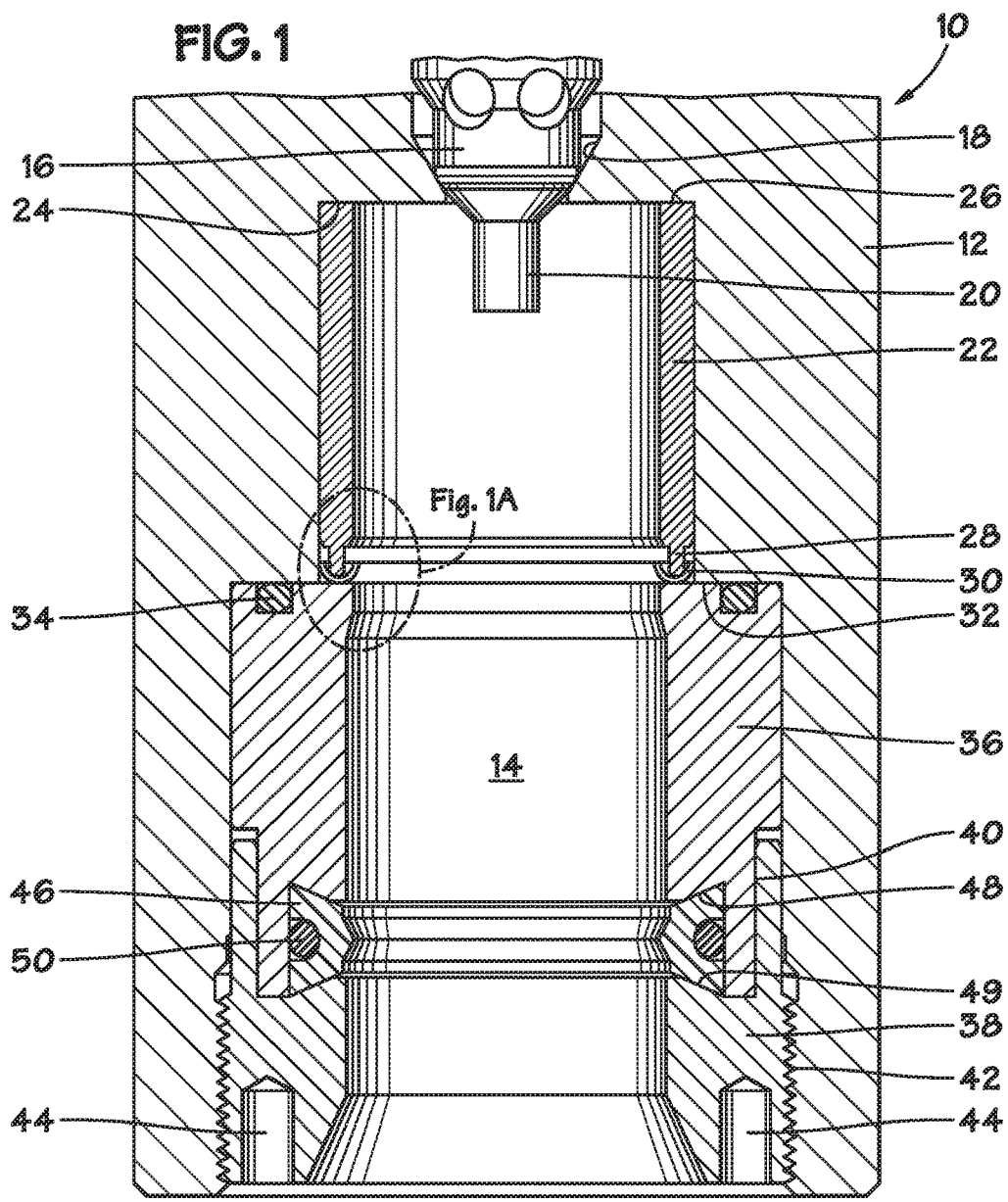
FIG. 1 is a cross-sectional view of a portion of a female hydraulic coupling member equipped with a bore liner according to an embodiment of the invention.

One particular exemplary embodiment is illustrated in the drawing figures. Female hydraulic coupling member 10 comprises generally cylindrical body 12 having central axial bore 14. Bore 14 has sections of different inside diameter (i.d.). The portion of bore 14 below poppet valve 16 in FIG. 1 comprises the receiving chamber of female coupling member 10. Spring-loaded poppet valve 16 seals against frusto conical surface 18 when the coupling members are disconnected. This seal prevents hydraulic fluid within female coupling member 10 from leaking out and seawater from leaking in. Poppet valve actuator 20 is configured to contact a corresponding actuator on a mating male hydraulic coupling member (not shown) and to open poppet valve 16 when the probe of the male hydraulic coupling member is fully seated in the receiving chamber of female hydraulic coupling member 10.

The illustrated embodiment has a dovetail probe seal 46 retained by inner seal retainer 36 and outer seal retainer 38 which is a part of a seal cartridge comprised of outer shell 38 which has an interference fit at 40 with inner seal retainer 36. Circumferential O-ring seal 50 may be provided on probe seal 46 to seal to seal cartridge inner member 36. Probe seal 46 is described in U.S. Pat. No. 5,052,439, the contents of which are hereby incorporated by reference in their entirety.

O-ring face seal 34 is provided in an annular groove on the inner end of seal cartridge inner member 36 for sealing to shoulder 32. Inner seal retainer 36 has angled shoulder 48 and outer seal retainer 38 has angled shoulder 49 which engage corresponding angled ends of probe seal 46 so as to provide a dovetail interfit that resists implosion of prove seal 46 in negative-pressure situations such as may occur upon withdrawal of the male probe from the receiving chamber of female coupling member 10.

The seal cartridge may comprise a generally cylindrical sleeve 36 that is at least partially inserted into outer shell 38 which has an externally-threaded portion 42 for engaging the bore 14 of female body 12. Sleeve 36 and shell 38 may have an interference fit at 40 such that withdrawal of shell 38 from body 12 effects removal of the entire seal cartridge. Spanner engagement blind holes 44 may be provided in shell 38 to allow an appropriate tool to be used to insert and/or remove the seal cartridge (comprised of elements 36, 46 and 38) as a unit.

Pressure-energized metal C-seal 30 provides a seal between the body of the female coupling member and the probe of a male coupling member inserted into the receiving chamber of the female member. Bore liner 22 has a first end 26 which bears against internal shoulder 24 and an opposing second end having projection 28 which fits within, supports, and retains metal C-seal 30. End 56 of projection 28 which fits within the C-seal may be rounded to conform to the curvature of the wall of hollow metal C-seal 30. Chamfered edge 54 may be provided on bore liner 22 proximate the base of projection 28. Chamfered edge 54 may help center the probe of a corresponding male coupling member as it is inserted into the receiving chamber of female coupling member 10.

Figure 1A:
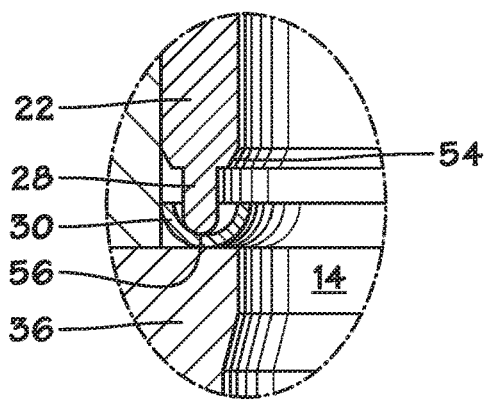
FIG. 1A is an enlargement of the portion indicated in FIG. 1.
Figure 1B:
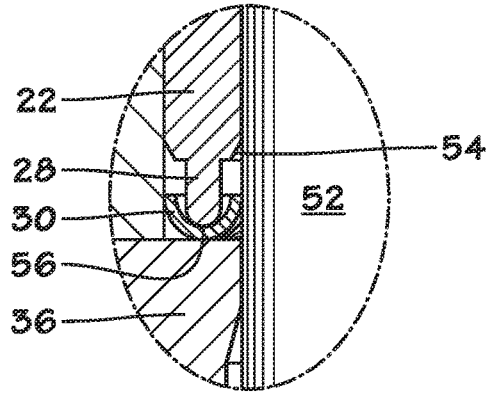
FIG. 1B is a partial cross-sectional view showing the portion illustrated in FIG. 1A with a male hydraulic coupling engaged in the receiving chamber of the female hydraulic coupling member.

Bore liner 22 may be made of any suitable material. Examples of suitable materials include metals, polymers, and composites. Bore liner 22 may be formed by any suitable method. Examples of suitable forming methods include machining and molding. Inasmuch as subsea hydraulic coupling members are often fabricated using a metal such as NITRONIC® stainless steel (AK STEEL CORPORATION, West Chester OHIO 45069), STELLITE® cobalt-based metal alloy (KENNAMETAL INC., LATROBE PENNSYLVANIA 15650), or INCONEL® nickel-chromium alloy (HUNTINGTON ALLOYS CORPORATION, HUNTINGTON WEST VIRGINIA 25705), bore liner 22 may be formed of a softer metal (such as brass) or a metal that is harder than the metal used to form the probe of the male coupling member so as to resist galling of male probe 52 (FIG. 1B). In an embodiment, bore liner 22 is formed of a metal having a hard, wear-resistant coating.

In the illustrated embodiment, pressure-energized metal C-seal 30 is oriented so as to be energized by hydraulic fluid pressure within the coupling member. In other embodiments which may not have projection 28 on bore liner 22, C-seal 30 may be orientated so as to be pressure-energized by the subsea hydrostatic head pressure. It will be appreciated by those skilled in the art that C-seal 30 may be orientated as desired to provide increased sealing effectiveness for either internal hydraulic fluid or seawater.

In this disclosure, pressure-energized C-seal 30 has been described as a metal C-seal inasmuch as those are the high-pressure C-seals that are commercially available as of the filing date hereof. It should be understood that high-pressure C-seals may, in the future, be fabricated from materials other than metal and such non-metal C-seals may be used in the practice of the invention.

For clarity of illustration, pressure energized metal C-seal 30 shown in the illustrated embodiment is semi-circular in cross section. It should be understood that hollow, pressure-energized metal C-seals having cross sections of more than 180 degrees are commercially available and may be substituted for the "half-circle" C-seal shown in the drawing figures. Various suitable pressure-energized metal C-seals are available from American Seal and Engineering Company, Inc. (Orange, Conn.).

FIG. 1B illustrates the radial compression of C-seal 30 (versus the uncoupled state illustrated in FIG. 1A) which may occur upon insertion of probe section 52 of a male hydraulic coupling member. In an embodiment, a recessed shoulder is provided on the inner end of seal cartridge inner member 36 to allow for axial extension of C-seal 30 that may occur in response to radial compression. In yet another embodiment, the length of bore liner 22 is reduced so as to allow room for such axial extension of C-seal 30.

Figure 2:
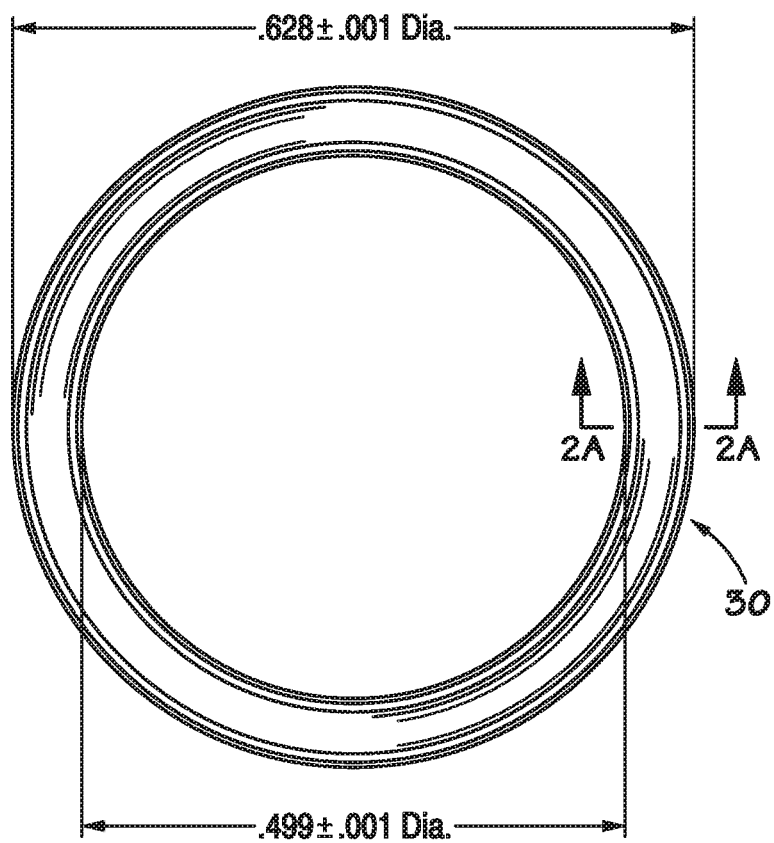
FIG. 2 is a top plan view (with dimensions shown in inches) of a representative metal C-seal of the prior art.
Figure 2A:
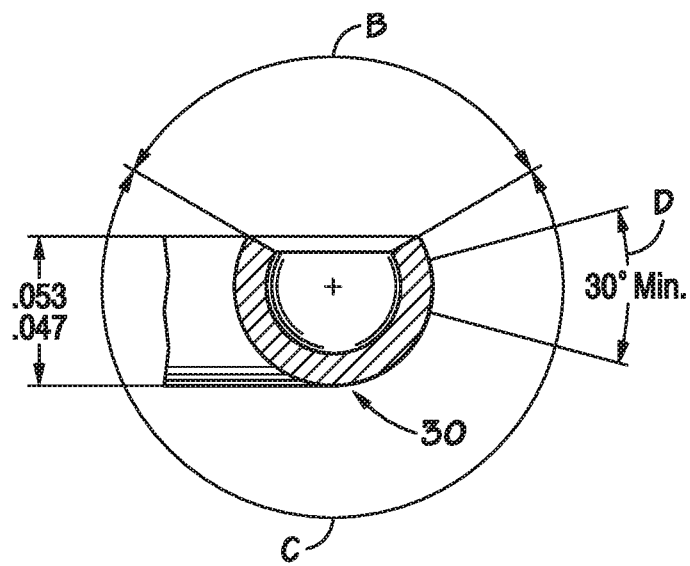
FIG. 2A is a cross-sectional view of the metal C-seal illustrated in FIG. 2 taken along line A-A.

FIGS. 2 and 2A depict a typical, commercially available metal axial C-seal 30 suitable for use in certain embodiments of the invention. Sector C of the outer surface (and optionally the inner surface) may be gold plated (per AMS 2422 0.001-0.0015 inch thick). In the area indicated as sector B, gold plating is optional and may be incomplete. In one particular preferred metal C-seal, the material is Alloy 718 per AMS 5596 (0.010±0.001 inch thick prior to forming) and the area indicated as sector D (symmetrical, both sides) has a surface finish of 16 microns.

In this disclosure, the pressure-energized C-seal has been described as a metal C-seal inasmuch as such are the high-pressure C-seals that are commercially available as of the filing date hereof. It should be understood that high-pressure C-seals may, in the future, be fabricated from materials other than metal and such non-metal C-seals may be used in the practice of the invention.

The foregoing presents particular embodiments of apparatus embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A female hydraulic coupling member for coupling with a probe of a corresponding male hydraulic coupling member, the female member comprising:
   a generally cylindrical body having a central axial bore;
   a receiving chamber in the central axial bore configured for receiving the probe of the corresponding male hydraulic coupling member;
   a pressure-energized C-seal having an internal cavity and positioned to seal between the body and the probe of the corresponding male hydraulic coupling member inserted in the receiving chamber and configured such that the sealing force of the pressure-energized seal increases with an increase in hydraulic fluid pressure; and
   a sleeve lining at least a portion of the receiving chamber, the sleeve having an inside diameter (i.d.) and an outside diameter (o.d.) with a first end of the sleeve abutting a shoulder in the central axial bore and an opposing second end of the sleeve having an annular, axial projection with a larger i.d. and a smaller o.d. than the sleeve and with at least a portion of the extension projecting into the internal cavity of the pressure-energized C-seal.

2. The female hydraulic coupling member recited in claim 1 wherein the sleeve and the annular, axial projection are fabricated of metal.

3. The female hydraulic coupling member recited in claim 2 wherein the metal is selected from the group consisting of stainless steel, a cobalt-based metal alloy, a nickel-chromium alloy, and brass.

4. The female hydraulic coupling member recited in claim 2 wherein the metal is plated with another metal.

5. The female hydraulic coupling member recited in claim 4 wherein the other metal is gold.

6. The female hydraulic coupling member recited in claim 1 wherein a distal end of the annular, axial projection is rounded.

7. The female hydraulic coupling member recited in claim 6 wherein the rounded, distal end has a radius of curvature which approximately equals that of the internal cavity of the C-seal.

8. The female hydraulic coupling member recited in claim 1 wherein the sleeve and the annular, axial projection are unitary.

9. The female hydraulic coupling member recited in claim 1 wherein the sleeve is retained in the receiving chamber by a removable seal cartridge.

10. The female hydraulic coupling member recited in claim 9 wherein the removable seal cartridge comprises a probe seal.

11. The female hydraulic coupling member recited in claim 10 wherein the probe seal is a polymer seal.

12. The female hydraulic coupling member recited in claim 10 wherein the probe seal comprises a circumferential O-ring seal on an outer surface of the probe seal.

13. A female member of a hydraulic coupling for communicating hydraulic pressure with a corresponding male member having a probe, the female member comprising:
   a body having a bore therein, the bore having a receiving chamber for receiving the probe of the corresponding male member, the receiving chamber having first and second shoulders;
   a sleeve lining at least a portion of the receiving chamber and having a first thickness, the sleeve having first and second opposing ends, the first end disposed toward the first shoulder, the second end having an annular projection extending therefrom toward the second shoulder, the annular projection having a second thickness less than the first thickness; and a pressure-energized C-seal disposed between the second end of the sleeve and the second shoulder of the receiving chamber, the C-seal having an internal cavity into which the annular projection extends, the C-seal configured to seal between the bore and the probe with a sealing force increasing with an increase in the hydraulic pressure.

14. The female member recited in claim 13 wherein the sleeve and the annular projection are fabricated of metal.

15. The female member recited in claim 14 wherein the metal is selected from the group consisting of stainless steel, a cobalt-based metal alloy, a nickel-chromium alloy, and brass.

16. The female member recited in claim 14 wherein the metal is plated with another metal.

17. The female member recited in claim 16 wherein the other metal is gold.

18. The female member recited in claim 13 wherein a distal end of the annular projection is rounded.

19. The female member recited in claim 18 wherein the rounded distal end has a radius of curvature which approximately equals that of the internal cavity of the C-seal.

20. The female member recited in claim 13 wherein the annular projection is sized and configured such that at least a portion of the annular projection fits within the internal cavity of the pressure-energized C-seal positioned to seal between a wall of the receiving chamber of the female member and the probe of the male member inserted in the receiving chamber.

21. The female member recited in claim 13 wherein the sleeve has a chamfered edge adjacent the annular projection.

22. The female member recited in claim 13 wherein the sleeve and the annular projection are unitary.

23. The female member recited in claim 13 wherein the sleeve is retained in the receiving chamber by a removable seal cartridge disposed in the bore, the seal cartridge having an opening for receiving the probe and providing the second shoulder of the receiving chamber.

24. The female member recited in claim 23 wherein the removable seal cartridge comprises a probe seal disposed in the opening and configured to sealably engage the probe of the corresponding male member.

25. The female member recited in claim 24 wherein the probe seal is a polymer seal.

26. The female member recited in claim 24 wherein the probe seal comprises a circumferential O-ring seal disposed on an outer surface of the probe seal, the O-ring seal engaging the opening of the removable seal cartridge.

* * * * *